US009053411B2

(12) United States Patent
Yach et al.

(10) Patent No.: US 9,053,411 B2
(45) Date of Patent: Jun. 9, 2015

(54) SYSTEM AND METHOD FOR TRANSFERRING DOCUMENTS

(75) Inventors: David Paul Yach, Waterloo (CA);
Danny Thomas Dodge, Ottawa (CA);
Peter H. Van Der Veen, Ottawa (CA);
Robert David Turner, Ottawa (CA)

(73) Assignees: 2236008 Ontario Inc., Waterloo (CA);
BlackBerry Limited, Waterloo (CA)

( * ) Notice: Subject to any disclaimer, the term of this patent is extended or adjusted under 35 U.S.C. 154(b) by 315 days.

(21) Appl. No.: 13/436,193

(22) Filed: Mar. 30, 2012

(65) Prior Publication Data

US 2013/0088733 A1 Apr. 11, 2013

Related U.S. Application Data

(60) Provisional application No. 61/473,488, filed on Apr. 8, 2011, provisional application No. 61/474,594, filed on Apr. 4, 2011.

(30) Foreign Application Priority Data

Oct. 14, 2011 (WO) .............................. 2011/056385

(51) Int. Cl.
*G06F 3/12* (2006.01)
*G06K 15/02* (2006.01)
(Continued)

(52) U.S. Cl.
CPC .......... *G06K 15/1889* (2013.01); *G06F 3/1219* (2013.01); *G06F 3/122* (2013.01); *G06F 3/1222* (2013.01); *G06F 3/1225* (2013.01); *G06F 3/1231* (2013.01); *G06F 3/1238* (2013.01); *G06F 3/1267* (2013.01); *G06F 3/1285* (2013.01); *G06F 3/1288* (2013.01); *G06F 3/1289* (2013.01); *G06F 2206/1512* (2013.01); *H04L 12/5835* (2013.01); *H04L 12/5895* (2013.01); *H04L 61/103* (2013.01); *H04L 61/15* (2013.01); *H04L 61/2076* (2013.01); *H04L 61/2575* (2013.01); *H04L 61/2589* (2013.01); *H04M 1/72522* (2013.01);
(Continued)

(58) Field of Classification Search
None
See application file for complete search history.

(56) References Cited

U.S. PATENT DOCUMENTS 6,301,609 B1 10/2001 Aravamudan et al.
6,886,036 B1 4/2005 Santamaki et al.
(Continued)

FOREIGN PATENT DOCUMENTS

EP 1808771 A1 7/2007
EP 1832971 A1 9/2007

OTHER PUBLICATIONS

European Search Report from corresponding EP application 12162354.0 dated Jul. 19, 2013.
(Continued)

*Primary Examiner* — Marcus T Riley
(74) *Attorney, Agent, or Firm* — Gowling Lafleur Henderson LLP

(57) ABSTRACT

Mobile devices enable users to access data and documents in a convenient portable format. The disclosed method and system enables documents to be transferred/moved onto a mobile device for review or reference by making the transfer simple and straight forward so that it is easy for non-technically literate users (e.g. administrative assistant putting documents on their executive's mobile device). From a sender perspective the transfer mechanism can work whether the mobile device is on a local network (relative to the sender) or on a remote network when the sender does not know the actual location of the mobile device.

23 Claims, 10 Drawing Sheets

(51) Int. Cl.
    *H04L 12/58* (2006.01)
    *H04L 29/12* (2006.01)
    *H04M 1/725* (2006.01)
    *H04L 29/08* (2006.01)

(52) U.S. Cl.
    CPC ......... *G06F 3/1297* (2013.01); *H04L 67/2823* (2013.01); *H04L 67/303* (2013.01); *H04L 67/2895* (2013.01)

(56) References Cited

U.S. PATENT DOCUMENTS

| | | | |
|---|---|---|---|
| 7,318,086 B2 * | 1/2008 | Chang et al. | 709/217 |
| 7,496,836 B2 * | 2/2009 | Hanson et al. | 715/234 |
| RE42,725 E * | 9/2011 | Chang et al. | 709/217 |
| 8,150,907 B2 * | 4/2012 | Otsuka et al. | 709/203 |
| 8,365,018 B2 * | 1/2013 | McIntosh et al. | 714/23 |
| 8,578,076 B2 * | 11/2013 | van der Linden et al. | 710/72 |
| 2002/0003535 A1 | 1/2002 | Cho | |
| 2002/0078149 A1 * | 6/2002 | Chang et al. | 709/203 |
| 2004/0205453 A1 | 10/2004 | Mortensen | |
| 2007/0155372 A1 | 7/2007 | Huang | |
| 2009/0013210 A1 * | 1/2009 | McIntosh et al. | 714/4 |
| 2009/0119280 A1 * | 5/2009 | Waters et al. | 707/5 |
| 2010/0309505 A1 * | 12/2010 | Partridge et al. | 358/1.15 |
| 2011/0022812 A1 * | 1/2011 | van der Linden et al. | 711/163 |

OTHER PUBLICATIONS

Traversal Using Relay NAT—wikipedia.org, Aug. 30, 2014.
The A Register—www.theregister.co.uk/2012/01/13/amazon_kindle_microsoft_doc_viewing.
Inter-Client Exchange (ICE) Protocol Version 1.1, 1993.
Session Traversal Utilities for NAT—wikipedia.org, Apr. 3, 2014.
International search report from priority application No. PCT/US2011/056385 dated Jan. 17, 2012.

* cited by examiner

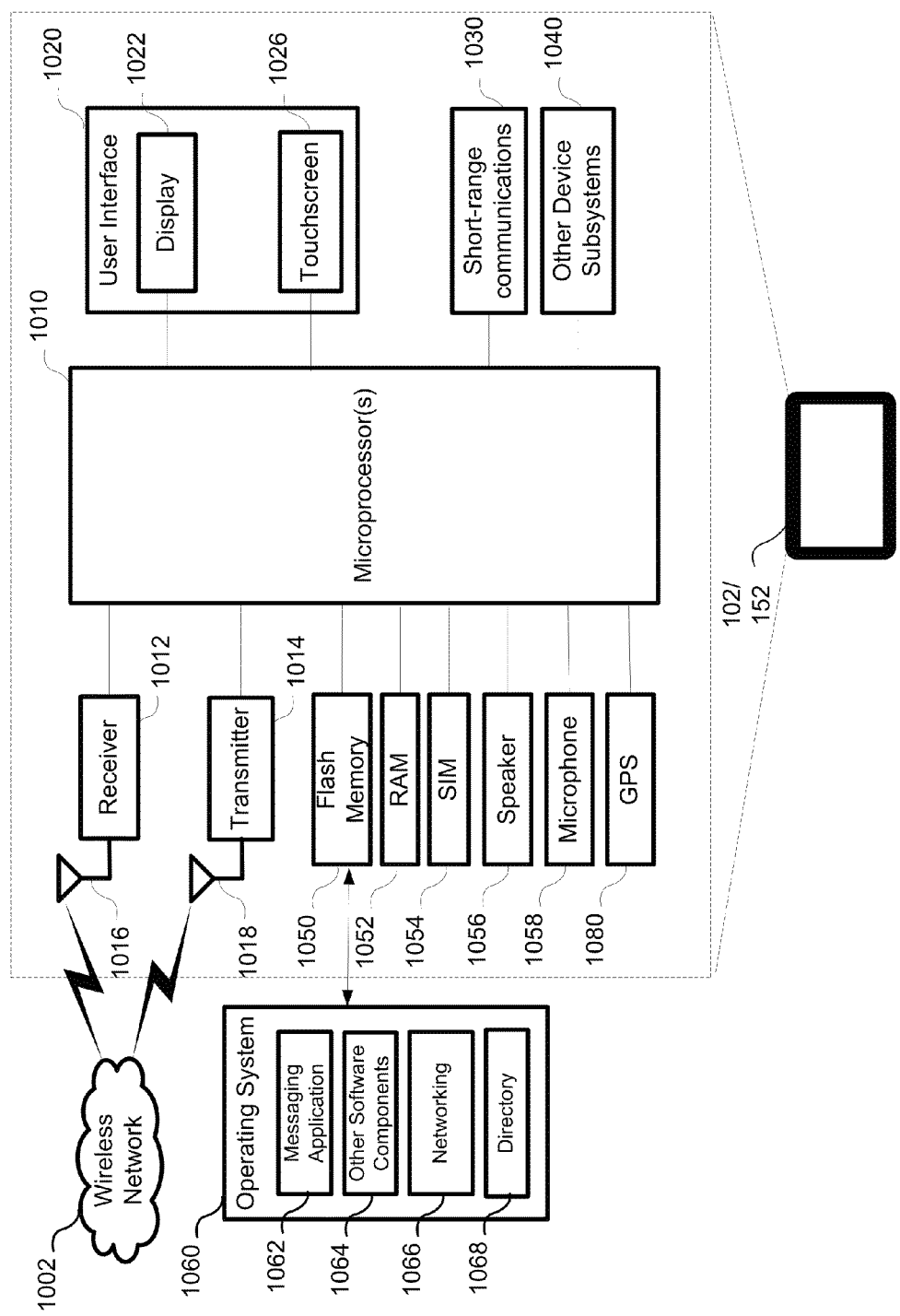

SYSTEM AND METHOD FOR TRANSFERRING DOCUMENTS

CROSS-REFERENCE TO RELATED APPLICATIONS

This application is related to and claims priority from U.S. provisional application Ser. No. 61/473,488 filed on Apr. 8, 2011, U.S. provisional application 61/471,594 filed Apr. 4, 2011 and PCT Patent application number PCT/US2011/056385 filed Oct. 14, 2011, the entirety of the disclosures are hereby incorporated by reference for all purposes.

TECHNICAL FIELD

The present disclosure relates to transferring electronic documents and in particular to transferring electronic documents to a mobile device using a mobile device printer driver.

BACKGROUND

As mobile devices such as e-book reader, tablet computers and smart phones become everyday tools that enable users to access data and documents in a convenient portable form factor, the integration into traditional document delivery mechanisms becomes more imperative. The delivery of documents to the mobile device have been typically limited to downloading via e-mail or from network based document sources or data stores such as a website through HTTP or FTP mechanisms. As mobile devices provide a more acceptable reading and presentation experience and move towards replacing paper based documents, the need for carrying paper documents can be reduced particularly when operating between a desktop office based work environment and a portable or mobile work environment. The presentation of documents on varying mobile device formats provided by differences in screen size and display resolution can present a sub-optimal experience when the document provided has not been generated with constraints of the mobile device in mind. In addition, integration of mobile devices into the networked office environment has been limited by lack of easy of integration with existing document delivery infrastructure.

Accordingly, systems and methods that enable printing to a mobile device remain highly desirable.

BRIEF DESCRIPTION OF THE DRAWINGS

Further features and advantages of the present disclosure will become apparent from the following detailed description, taken in combination with the appended drawings, in which:

FIG. 10 shows a schematic representation of a mobile device.

It will be noted that throughout the appended drawings, like features are identified by like reference numerals.

DETAILED DESCRIPTION

Figure 1:
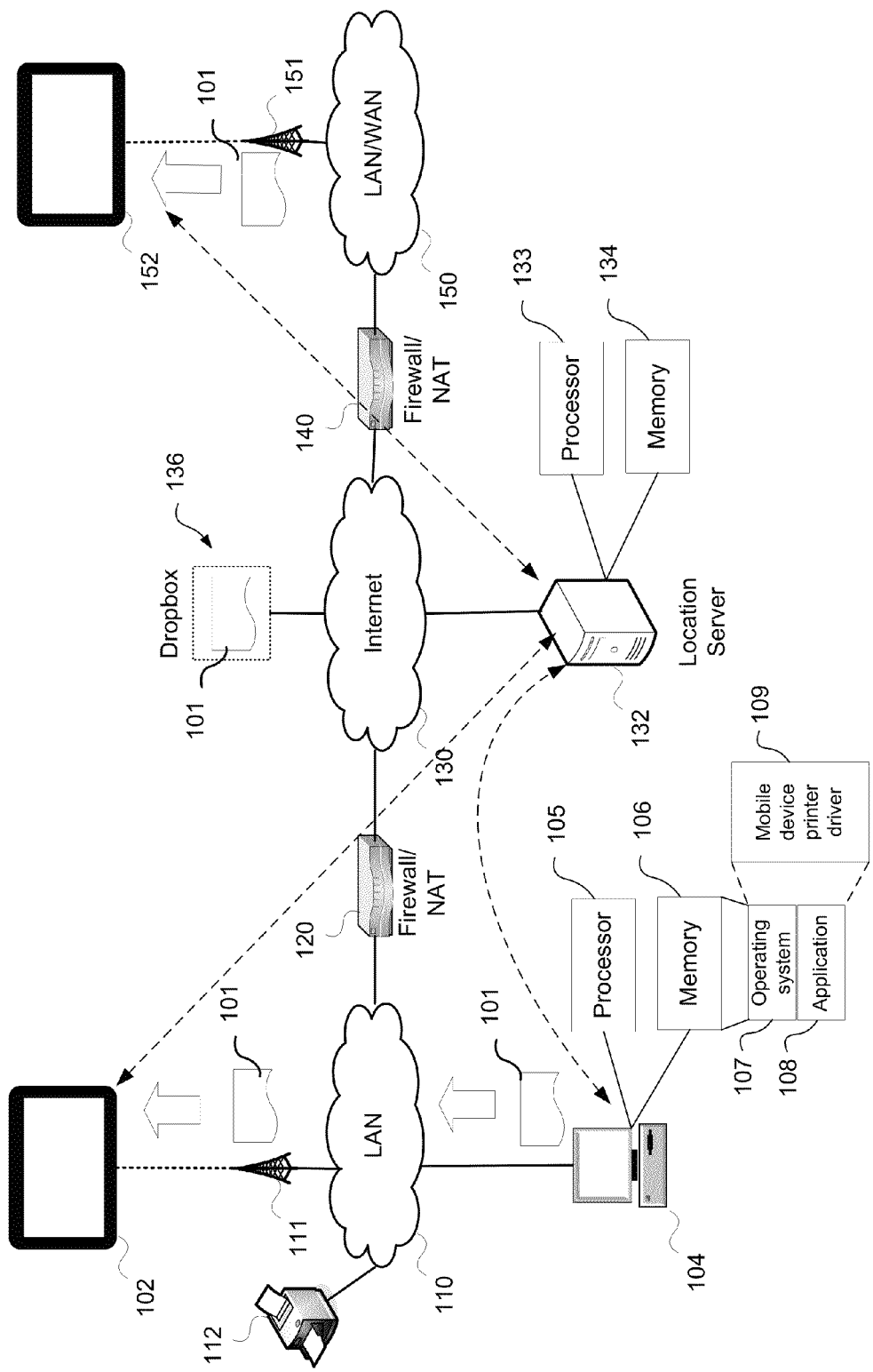
FIG. 1 shows a representation of a system for document printing from a sender device to a mobile device.

In accordance with an aspect there is provided a method of transferring an electronic document from a sending device to a mobile device the method comprising sending from the sending device to a location server a request generated from a mobile device printer driver executed by the sending device, the request comprising a target identifier for receiving the electronic document; receiving at the sending device from the location server a network identifier of the mobile device associated with the target identifier, the network identifier provided to the location server by the mobile device after the mobile device has registered to a network; formatting at the sending device the electronic document based on one or more parameters associated with the mobile device; and transferring the formatted electronic document from the sending device using the network identifier.

In accordance with another aspect there is provided a sending device for transferring an electronic document, the sending device comprising: a processor; a memory coupled to the processor containing instructions for execution by the processor, the instruction for performing: sending to a location server a request generated from a mobile device printer driver executed by the sending device, the request comprising a target identifier for receiving the electronic document; receiving from the location server a network identifier of a mobile device associated with the target identifier, the network identifier provided to the location server by the mobile device after the mobile device has registered to a network; formatting the electronic document based on one or more parameters associated with the mobile device; and transferring the formatted electronic document using the network identifier.

In accordance with yet another aspect there is provided a computer readable memory containing instructions for transferring an electronic document from a sending device to a mobile device, the instructions which when executed by a processor perform: sending from the sending device to a location server a request generated from a mobile device printer driver executed by the sending device, the request comprising a target identifier for receiving the electronic document; receiving at the sending device from the location server a network identifier of the mobile device associated with the target identifier, the network identifier provided to the location server by the mobile device after the mobile device has registered to a network; formatting at the sending device the electronic document based on one or more parameters associated with the mobile device; and transferring the formatted electronic document from the sending device using the network identifier.

Embodiments are described below, by way of example only, with reference to FIGS. 1-10. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Mobile devices enable a user to access data and documents in a convenient portable format. The disclosed system and method enables documents to be transferred/moved onto a mobile device for review or reference by making the transfer simple and straight forward so that it is easy for non-technically literate users (e.g. administrative assistant putting documents on their executive's mobile device). From a sender's perspective the transfer mechanism can work whether the mobile device is on a local network (relative to the sender) or on a remote network when the sender does not know the actual location of the mobile device.

FIG. 1 shows a representation of a system for document printing to a mobile device. To transfer documents from a sending device 104, the mobile device 102/152 is presented using a printer metaphor accessible within an operating system and applications of the sending device 104. The mobile device 102/152 is represented as a printer on a sender device 104 and the user 'prints' electronic documents 101 to the mobile device 102/152. The mobile device 102 may be connected to a wireless interface 111 to a local area network (LAN) 110 or may be connected to a remote LAN having wireless capability or wide area network (WAN) 150 such as a wireless service provider network through a wireless interface 151. The sender device 104 may be a personal computer or computing device that supports printer functionality comprising at least a processor 105 and memory 106 for executing instructions to provide applications that enable a user to direct documents to a printer. The memory 106 can store an operating system 107 and applications 108 which can access a mobile device printer driver 109 that can be installed on the sender device 104 and configured to 'point' to one or more mobile devices 102/152 or associated user accounts. The mobile device printer driver 109 is configured with identification information associated with one or more mobile devices 102/152 and may also include security or credential information associated with any of the sender device 104, mobile device 102/152 and a device user. Similar to using a network printer 112, the user is not exposed to the details of connecting to the printer once it is configured.

By using a printer metaphor, the sender can control both the content and the presentation of the electronic document 101 transferred to the mobile device 102/152 as compared to a file transfer mechanism (e.g. FTP) that would only allow the sender to control the content (i.e. picking the file to be transferred). The use of a mobile device printer driver on the sender device 104 allows the sender to influence presentation aspects such as, for example, page format, margins, orientation, page range, and other similar presentation aspects. The electronic document 101 is transferred to the mobile device 102/152 in one of one or more pre-established file formats (e.g. PDF or PS). The sender does not need to be concerned with the presence of an application that supports a particular file format (e.g. .DOC, .XLS, .PPT, .PS, .PDF) on the mobile device 102/152.

Each mobile device 102/152 that is configured to receive electronic documents 101 via the printer driver mechanism exposes one or more share directories in its file system that each is a target for electronic document 101 delivery. Various forms of privileges and access control can be enabled to provide security for the share directory. Each mobile device 102/152 can support multiple share directories each potentially having different privilege and access control setting (e.g. a corporate share directory and a personal share directory on the same mobile device 102/152) that can be associated with credentials or privileges associated with the sender device 104 or a user of the sender device 104.

From time-to-time in response to changes in the mobile device 102/152 network context, for example when connecting to a new network 150 by a wireless interface 151, the mobile device 102/152 registers with a location server 132 by providing it's current network address such as an Internet Protocol (IP) address. The mobile device 102/152 may also provide the names of its one or more share directories and device interface identifiers (IDs), such as a media access control (MAC) address associated with the network address. Alternatively this information may be pre-configured or stored at the location server 132. If the mobile device 102/152 has access through multiple interfaces, the registration may include identification of multiple network addresses and device interface IDs.

The location server 132 may be located so that it is accessible by any mobile device 102/152 that has connectivity to the Internet 130 or any similar widely available connection medium. The location server 132 may maintain mobile device configuration information such as the network address ID, device interface ID, share directories, access privileges, dropbox locations associated with one or more mobile devices 102/152. The mobile device may be associated with user account identifier such as a user name or e-mail address. The account or user identifier may be associated with multiple mobile devices enabling a document to be directed to one or more of the mobile devices. For example one account may have multiple mobile devices such as a tablet device and a smartphone associated with it, where a print request may send the document to both devices, or only to an active or accessible device. The location server 132 may be a distributed service executed by one or more computers or servers having processors 133 and associated memory 134 for executing instructions.

When the mobile device printer driver on the sender device 104 wants to transfer an electronic document 101 to the mobile device 102/152, the sender device 104 sends a print request to the location server 132. The request may contain a device identifier or a user account identifier. In response to the print request the location server 132 may provide one or more network address identifiers and device interface identifier of the target mobile device 102/152 and may also provide a share directory identifier if one is not already pre-selected or the location server 132 may request connection information from the mobile device 102/152 which is in turn provided to the sender device 104. A transfer mechanism incorporated in, or associated with, the mobile device printer driver then uses the mobile device IP address to establish a connection with the mobile device 102/152. The transfer mechanism may use a universal resource locator (URL) identifier associated with the mobile device 102/152. The URL may define a hyperlink transfer protocol (HTTP), HTTP secure (HTTPS) or file transfer protocol (FTP) address to allow a session to be initiated between the sender device 104 and the mobile device 102/152 using secure socket layer or transport layer security (SSL/TLS). In an HTTP or HTTPS transfer the sender device can utilize HTTP post to transfer the electronic document 101. Depending on the location of the mobile device 102/152 relative to the sender device 104 different connection delivery techniques may be required to transfer the electronic document 101. The sender device 104 can determine if a direct connection can be performed with the mobile device 102 and will initiate a connection to transfer the electronic document 101. If the mobile device 152 has an IP address on another network 150 then any intervening firewalls and/or Network Address Translators (NAT) 120 or 140 may interfere with connectivity and an alternate connection mechanism may be required to successfully deliver the electronic document 101. The mechanisms may include the use of protocols such as, for example, Session Initiation Protocol (SIP)/Session Description Protocol (SDP), Simple Traversal of User Datagram Protocol through Network Address Translators (STUN), Traversal Using Relay NAT (TURN), and Interactive Connectivity Establishment (ICE) provided by the location server 132 or one or more other servers. When connection to the mobile device 104/152 is not possible, a network dropbox 136 may be utilized to transfer documents to a location by utilizing network storage. The mobile device 152 may periodically check the network dropbox 136 for new electronic documents 101 or access the dropbox 136 based upon receipt of a kicker packet from the sender device 102 providing notification of the presence of a electronic document 101.

Figure 2:
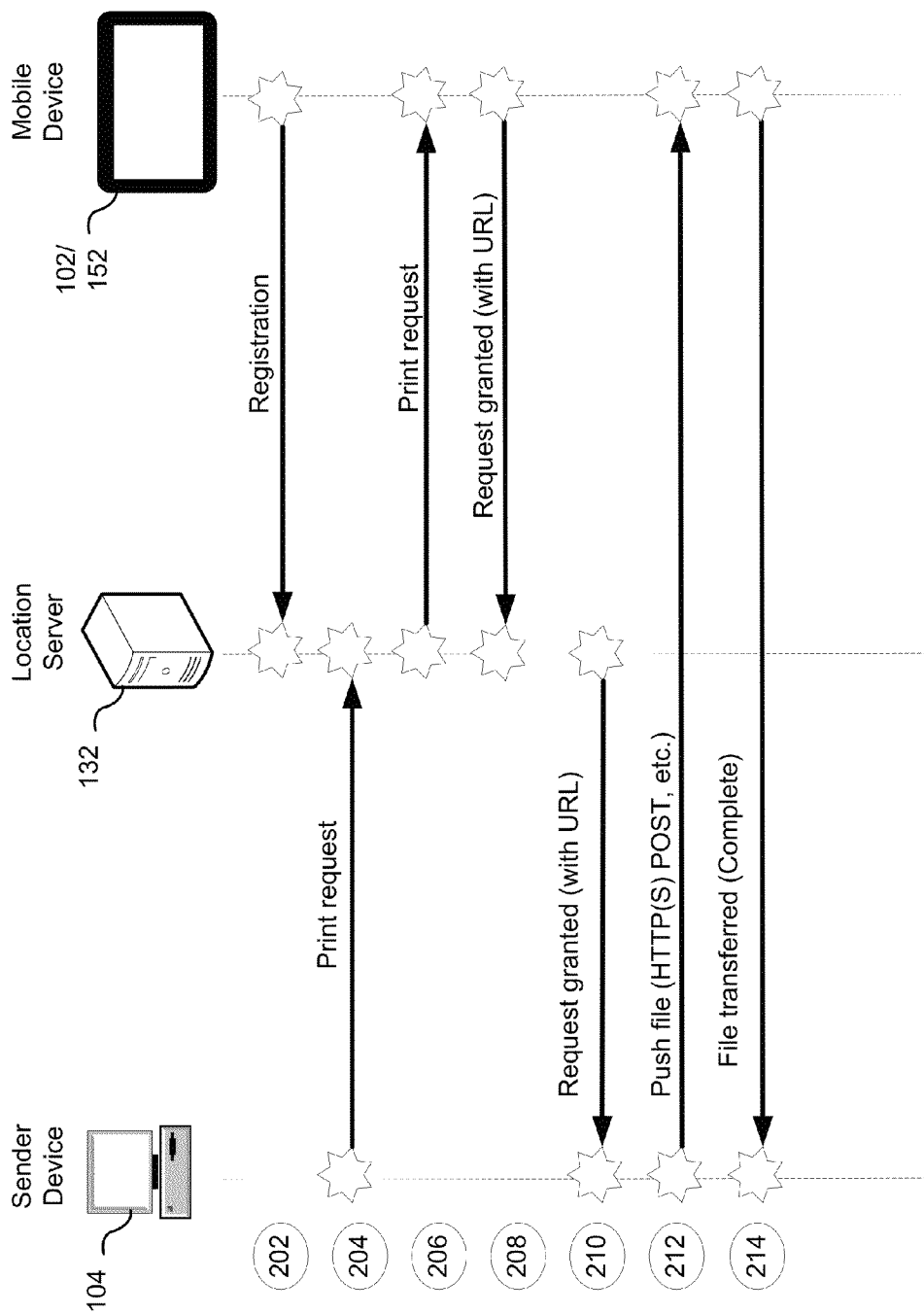
FIG. 2 shows a message flow for document printing from a sender device to a mobile device.

FIG. 2 shows a message flow for document printing from a sender device to a mobile device where the mobile device 102/152 is on the same network 110 as a sender device 104, or has a public IP address on remote network 130 or 150 that does not utilize NAT. When the mobile device 102/152 changes network context, for example by registering on a new network, for example through a dynamic host configuration protocol (DHCP) registration where the device 152 receives a new network address from the network, a registration message (202) is sent to a location server 132 coupled to a network 130 accessible by the mobile device 102/152. Alternatively the mobile device 152 may recognize that a networking device interface is activated, that may have a fixed or a previously assigned network address, to trigger sending of the registration message. The registration message comprises at least a device identifier and a network address and may also include a device interface identifier such as a MAC address, and may also include a target directory for receiving the electronic documents 101 on the mobile device 102/152. When the mobile device 102/152 has multiple network interfaces active, the registration may include identification of multiple network addresses and network interface identifiers.

At the sending device 104, such as a personal computer, when the user selects to print an electronic document 101 to the mobile device 102/152, the mobile device print driver 109 sends a request (204) referred to as a 'print request' in this disclosure, to the location server 132. The print request may identify the mobile device 102/152 by a unique identifier or by a user account which may be associated with more than one mobile device 102/152. This print request may be in the form of an HTTP post or a secure HTTPS post. The programming interface for the sender device 104 and the location server 132 may be RESTful (Representational state transfer using HTTP). The location server 132 forwards the print request to the mobile device 102/152 (206). This message from the location server 132 may be in a different format. For example, the location server 132 may communicate the request to the mobile device 102/152 using session initiation protocol (SIP). When the mobile device 102/152 accepts the request to receive printed electronic document 101 it returns a URL or a secure URL to the location server 132 (208) to grant access to via a transfer mechanism and a location on the mobile device 102/162 that can be used to transfer the electronic document 101. The transfer of the information may alternatively utilize SIP. The mobile device may provide security information such as a password, token or certificate to the sender device or the mobile device may use the location server 132 or other central server as a certificate authority to connect to the mobile device 102/152. The location server 132 forwards the URL to the sender device 104 (210). The sender device 104 may use this URL to push the file to the mobile device 102/152 with an HTTP post or an HTTPS post if security is required or other direct peer-to-peer transfer mechanism such as FTP. The electronic document may be formatted to be compatible with the mobile device based upon desired parameters in the print driver, parameters provided in response the location request, or by performing a database lookup to determine the appropriate formatting parameters for the target device. For example the size of the document, resolution, content, or the type of document container, such as .PDF, .PS, .DOC may be modified to match the resources of the mobile device 102/152 and then sent to the mobile device (212). The transfer process is complete when the mobile device 102/152 indicates that the transfer is complete (214). If the transfer is unsuccessful the sender device 104 may request alternate connection mechanism from the location server 132.

Figure 3:
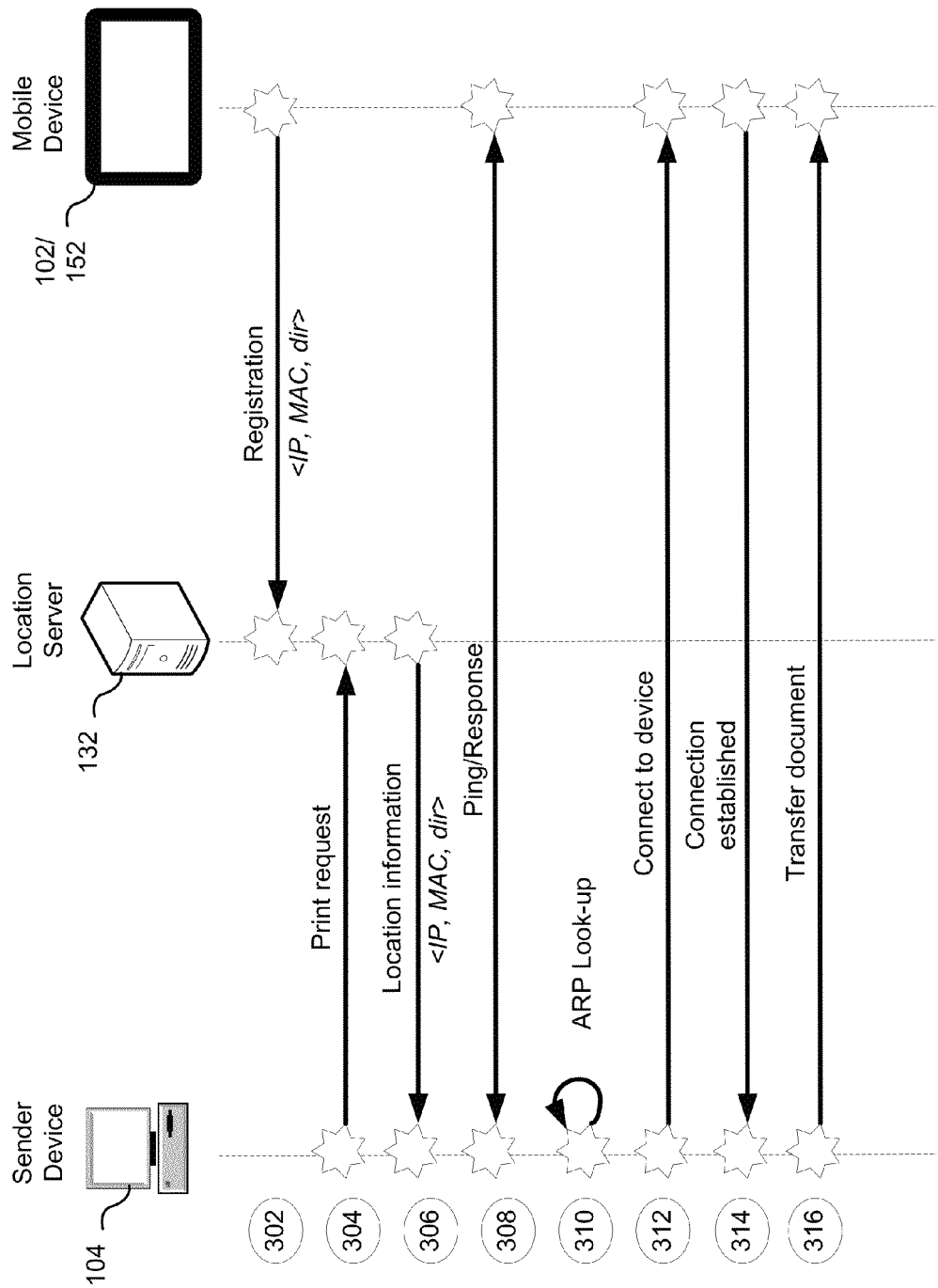
FIG. 3 shows an alternate message flow for document printing from a sender device to mobile device.

FIG. 3 shows a message flow when a mobile device 102/152 is on the same network 110 as a sender device 104, or has a public IP address on remote network 130 or 150 that does not utilize NAT. When the mobile device 102/152 changes network context, for example by registering on a new network, for example through a dynamic host configuration protocol (DHCP) registration where the device 152 receives a new network address from the network, a registration message (302) is sent to a location server 132 coupled to a network 130 accessible by the mobile device 102/152. Alternatively the mobile device 152 may recognize that a networking device interface is activated, that may have a fixed or a previously assigned network address, to trigger sending of the registration message. The registration message comprises at least a device identifier and a network address and may also include a device interface identifier such as a MAC address, and may also include a target directory for receiving the electronic documents 101 on the mobile device 102/152. When the mobile device 102/152 has multiple network interfaces active, the registration may include identification of multiple network addresses and network interface identifiers. At the sending device 104, such as a personal computer, when the user selects to print an electronic document 101 to the mobile device 102/152, the mobile device print driver 109 sends a print request (304) to the location server 132. The print request may identify the mobile device 102/152 by a unique identifier or by a user account which may be associated with more than one mobile device 102/152.

The location server 132 performs a look-up to determine the current location of the mobile device 102/152 and provides location information (306) including, for example, a network address and a device interface identifier, associated with the mobile device 102/152, to the sender device 104. Location information may be provided for more than one device if multiple devices are associated with a user account identifier. The location server 132 may also identify one or more directories on the mobile device 102/152. A directory may be determined based upon the sender device 104 credentials, a document type or selection made by the user upon sending the print request. The device identifier used by the location server 132 may be associated with one or more mobile devices 102/152, where location server 132 may in turn provide location information 306 for more than one mobile device 102/152.

The sending device 104 then may send a ping request comprising an echo request packet to the identified network address (or addresses) and receives one or more echo responses (308) from the destination associated with the network address. Through the ping mechanism the MAC address associated with the network address can be determined through an address resolution protocol (ARP) look-up (310). If the MAC address determined by the ARP look-up matches the device interface identifier provided by the location server 132 a connection request to the mobile device 102/152 can be made. The connection request to the mobile device 102/152 (312) can be sent. Once the connection is established (314) the electronic document 101, which is formatted for the device via the printer driver, can be transferred to the mobile device 102/152 (316) to the designated destination directory.

Figure 4:
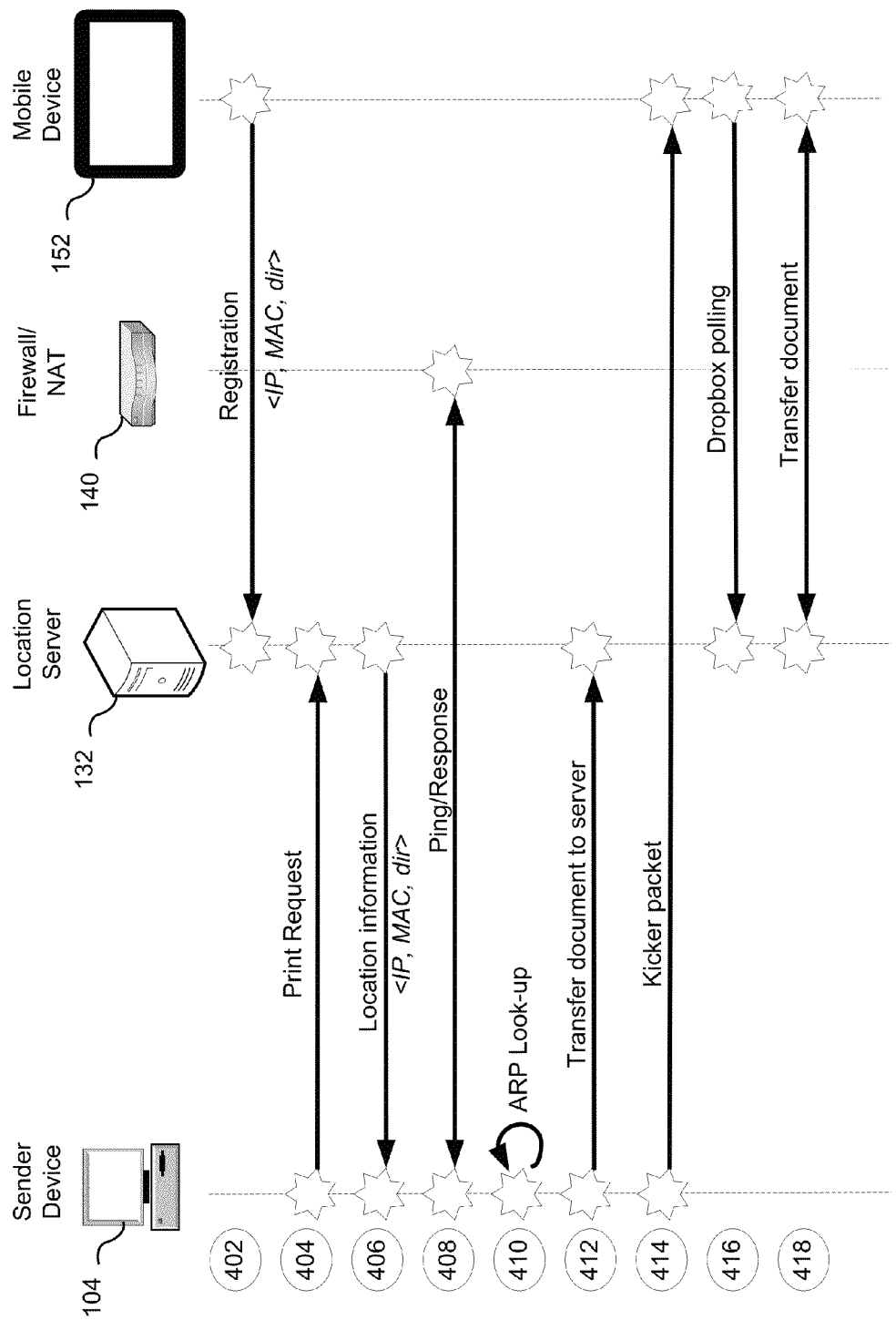
FIG. 4 shows a message flow for document printing to a mobile device using a drop box.

FIG. 4 shows a message flow when a mobile device is not directly accessible and must be accessed through a NAT device 140 which blocks the ability to directly connect to the mobile device 152. When the mobile device 152 changes network context, for example by registering on a new network or through a dynamic host configuration protocol (DHCP) where the device 152 receives a new network address from the network, a registration message (402) is sent to a location server 132 coupled to a network 130 accessible by the mobile device 102/152. Alternatively the mobile device 152 may recognize that a networking device interface is activated, that may have a fixed or previously assigned network address associated with it, to trigger the registration message being sent. In this example the mobile device 152 is behind the NAT device 140 and is not provided with a public or directly accessible address and the registration message may therefore also include a port identification and packet content for a kicker packet, which may be randomly generated. The kicker packet is sent from the sender device 104 to the mobile device 152 to identify that a drop box 136 is being utilized to facilitate transfer of the electronic document 101. When the mobile device 152 provides kicker packet information, the sender device 104 can generate a packet that will be expected by the mobile device 152 to signify that a document is at the dropbox 136. At the sending device 104, such as a personal computer, when user selects to print a document in an application, the mobile device printer driver 109 sends a print request (404) to the location server 132. The print request may identify the mobile device 152 by a unique identifier or by a user account identifier.

The location server 132 performs a look-up to determine the current location of the device and provides (406) the network address and a device interface identifier and may also provide a directory on the mobile device 102/152. The sending device 104 then may send a ping request comprising an echo request packet to the identified network address (or addresses) and receives one or more echo responses (408). Through the ping mechanism the MAC address associated with the network address can be determined through an ARP table look-up (410). In this example, if the MAC address determined by the ARP look-up does not match the device interface identifier provided by the location server 132, an alternate mechanism can be utilized to deliver the electronic document 101 to the mobile device. The sending device 104 can send the electronic document 101 (412) to a dropbox 136 on the location server 132 or a network-based or cloud-based storage location associated with the mobile device 152 or user. The electronic document 101 transfer may involve additional queries/responses between the sender device 104 and location server 132 to determine the appropriate location to transfer the electronic document 101. The sender device 104 may send a kicker packet (414) using the port number and packet content provided in the registration message to the location server 132 and provided to the sender device 104 in the location information message. The kicker packet may be a User Datagram Protocol (UDP) packet using the port number and packet content that may be randomly generated by the mobile device 152. The port and content may be randomly generated to reduce security implications of sending a device specific message that may be utilized in malicious attacks such as a denial of service attack. The mobile device 152 can then periodically poll the network storage, or dropbox 136, location (416) or check the dropbox 136 based upon a notification being received at the mobile device 152 to retrieve the electronic document 101. The electronic document 101 can then be transferred (418) to the design destination folder on the mobile device 152.

Figure 5:
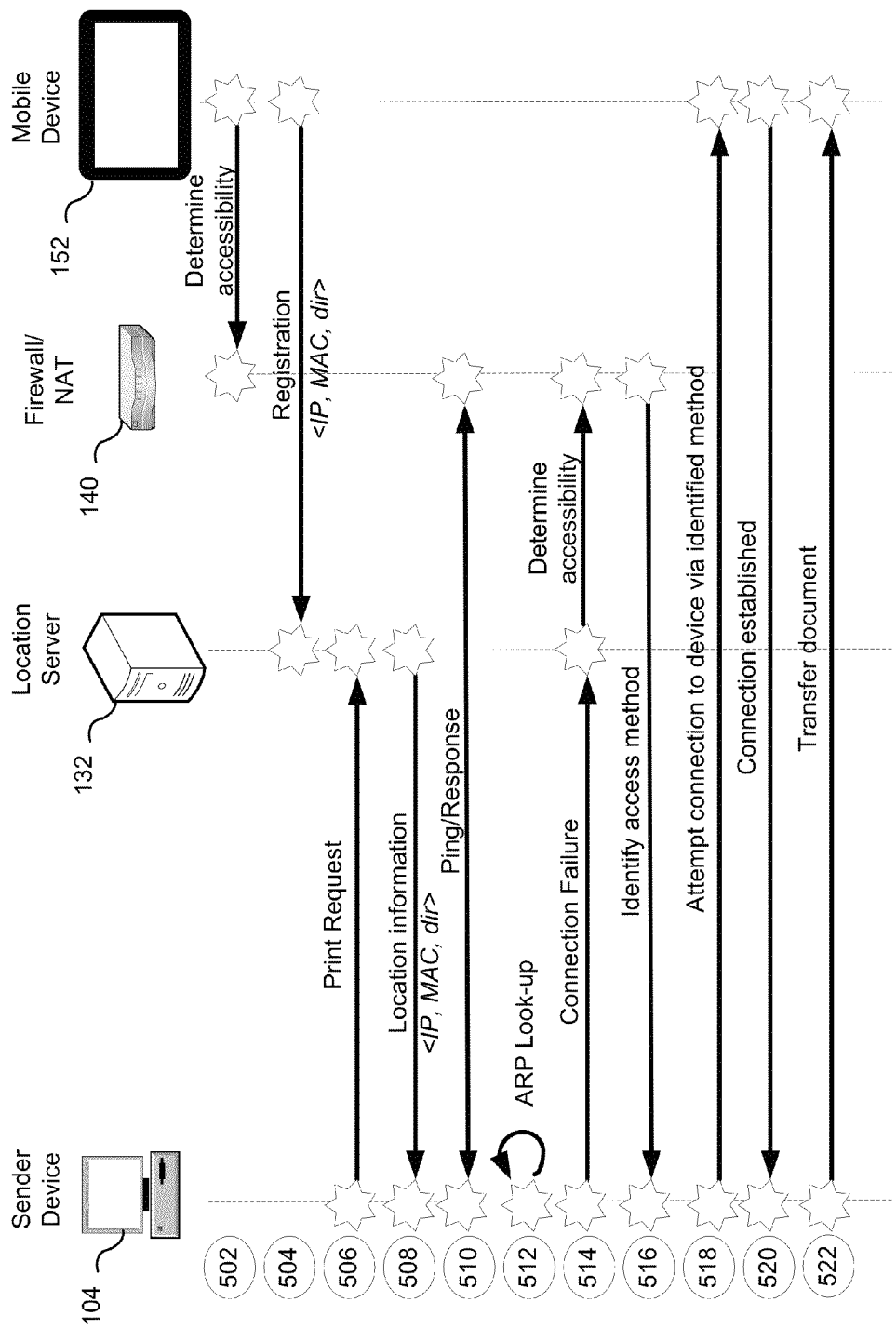
FIG. 5 shows an alternate message flow for document printing to a mobile device using network address translation (NAT) traversal.

FIG. 5 shows an alternate message flow when a mobile device 152 is on a different network than a sender and must traverse through a firewall/NAT device 140 which limits the ability to directly connect to the mobile device 152. When the mobile device 152 changes network context, by registering on a network 150, the mobile device 152 may determine accessibility (502) through the NAT device or firewall by identifying potentially open ports or by requesting access to specific ports with the firewall/NAT device 140. A registration message (504) is sent to a location server 132. In this case the mobile device 152 is behind the NAT device 140 and is not provided with a public address or a directly accessible address. The registration message may also include identification of one or more ports that may be accessible to traverse the firewall and provide a subnet address that is currently assigned to the mobile device 152 in addition to the network address of the firewall/NAT (or associated access device) and the device interface identifier. At the sending device 104, such as a personal computer, when user selects to print a document in an application, the print driver sends a print request (506) to the location server 132. The print request may identify the mobile device 152 by a unique identifier or by a user account.

The location server 132 performs a look-up to determine the current location of the mobile device 102/152 and provides (508) the network address and a device interface identifier and may also provide a directory on the mobile device 102/152. The sending device 104 then may send a ping request comprising an echo request packet to the identified network address (or addresses) and receives one or more echo responses (510). Through the ping mechanism the MAC address associated with the network address can be determined through an ARP table look-up (512). In this example, if the MAC address determined by the ARP look-up does not match the device identifier provided by the location server 132, an alternate mechanism may be utilized to deliver the electronic document 101. The sending device 104 sends a connection failure notification (514) to the location server 132. The location server 132 can then perform characterization to determine traversal options of the firewall/NAT device 140. This may involve determination of a port to allow access to the mobile device 152 or via a relay protocol through the location server 132 such as including the use of protocols such as SIP/SDP, STUN, TURN, and ICE. In this example the alternate mechanism may, for example, be identification of a communication port associated with the network address which is provided (516) to the sender device 104 and a connection is then be attempted by the sender device (518). The additional connection attempt may or may not involve an ARP network address verification depending on the alternate communication mechanism. If the connection is successfully established (520), the electronic document 101 is transferred to the device (522). If the connection is not established, the electronic document 101 may be uploaded to a network-based or cloud-based storage location associated with the mobile device 152 as described in relations to FIG. 4. Alternatively, if the mobile device 152 determines that the firewall and/or NAT device 140 cannot be traversed, the registration message may identify that the dropbox 136 is required and (510) to (520) may be bypassed and a drop box utilized as described in connection with FIG. 4 by using a notification mechanism such as a kicker message or by the mobile device 152 polling the dropbox 136.

Figure 6:
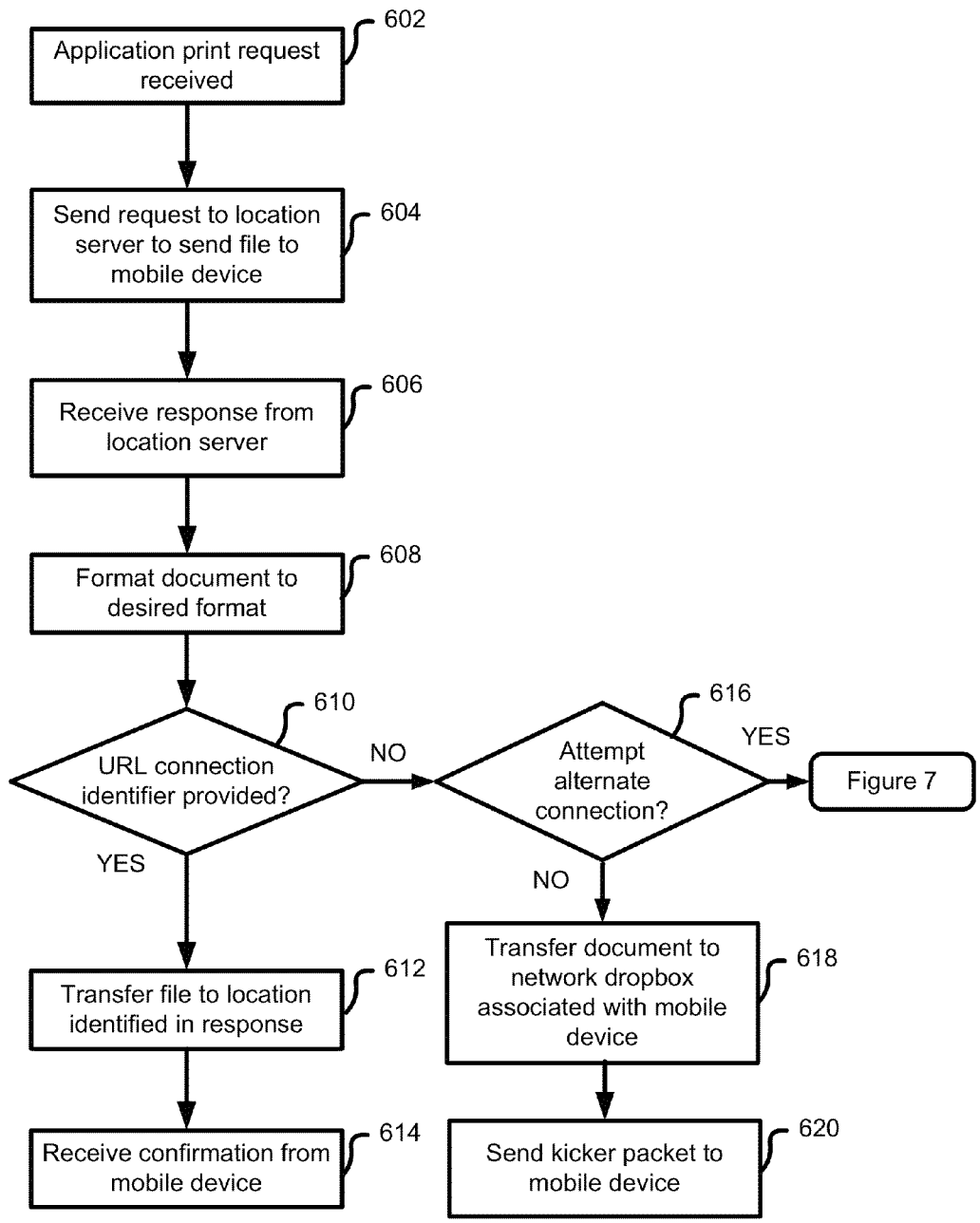
FIG. 6 show a method of operation of a sending device for printing to a mobile device.

FIG. 6 show a method of operation of a sending device for printing to a mobile device. The sender device 104 may be a computing device such as a personal computer or another mobile device using a printer metaphor to allow document printing from an application to a mobile device 102/152. The application on the sender device 104 generates a print request to a printer driver resident on the device (602). When a printing action is commenced on the sender device 104 the mobile device printer driver 109 may be pre-associated with a particular mobile device 102/152 or a user account associated with multiple mobile devices 102/152 or the user may be asked for a user identifier.

The printer driver 109 sends a request from the sender device 104 to the location server 132 (604). The location request includes a mobile device identifier or a user identifier associated with one or more target mobile devices 102/152. The location request may also include a sender identifier to determine access rights or directory location for the sender on the mobile device 102/152. The location server 132 then provides a response to the sender device 104 (606) the response may identify a location identifier and access method or a drop box identifier where the electronic document 101 can be sent. The location information may also include document format preferences. The electronic document 101 may then be converted into the desired format for the mobile device 102/152 (608) or may be converted only when a connection is established with the mobile device 102/152. If URL connection identifiers are provided (YES at 610), the electronic document 101 can be pushed to the file location identified by the URL in the response (612). When the file transfer is complete the mobile device 102/152 provides confirmation to the sender device 104 (614). If URL connection identifier is not provided (NO at 610) and alternate connection methods are not available (NO at 616) the electronic document 101 may be transferred to an identified network dropbox (618) associated with the mobile device 102/152 identified in the server response (606). A kicker packet can then be sent from the sender device 104 to the mobile device 102/152 (620) to identify that the electronic document 101 is available for retrieval. If alternate connection information or identifiers are provided (YES at 616), or defined in the configuration of the printer driver 109, the method continues as shown in FIG. 7.

Figure 7:
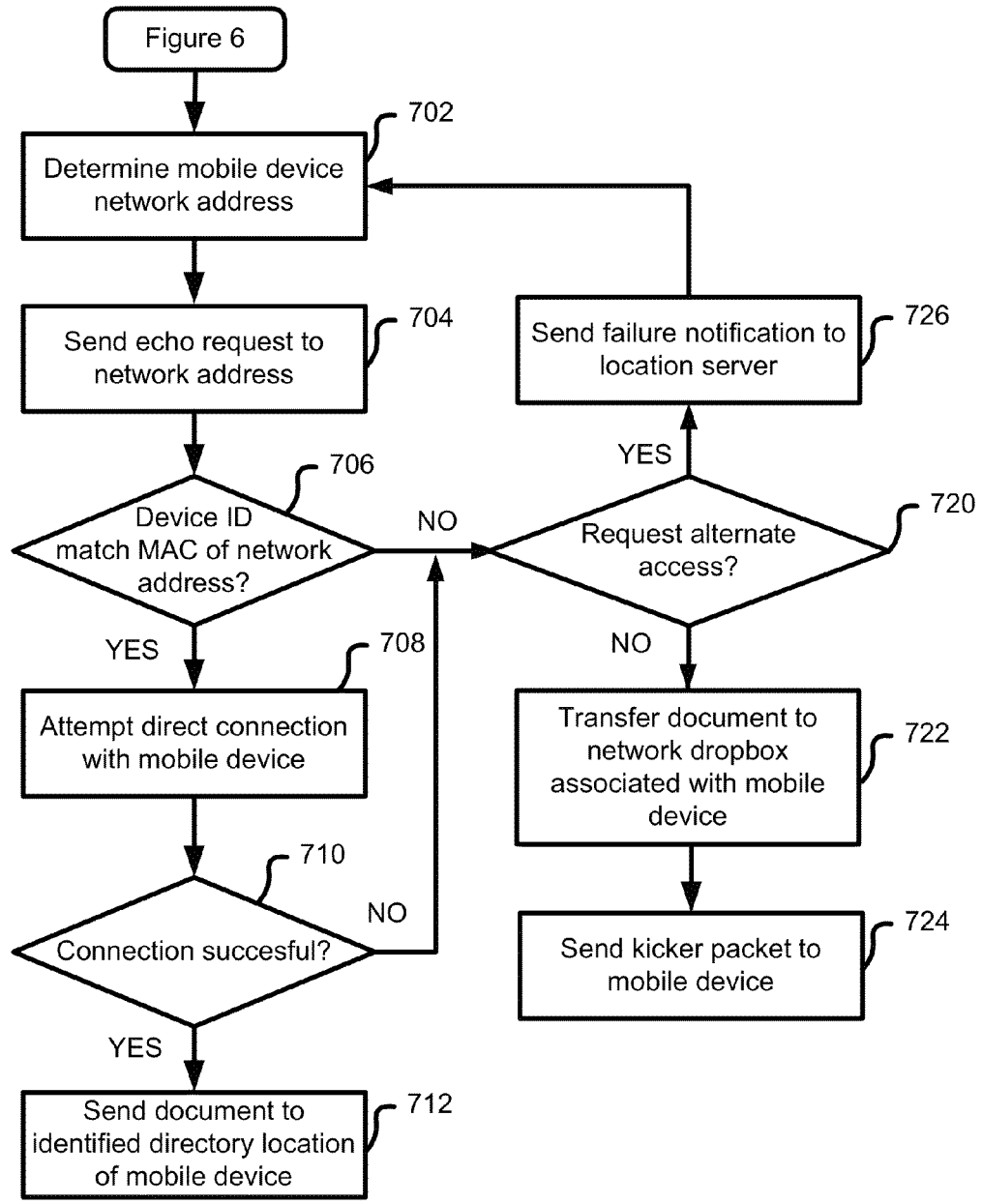
FIG. 7 shows an additional method of operation of a sender device printing to a mobile device.

As shown in FIG. 7, if a network address access method is identified or specified in the printer driver 109 the network address of the mobile device 102/152 is determined (702). The sender device 104 sends an echo request message, such as a ping message, to the network address to which an echo response is received (704). From the ping message a medium access control (MAC) is determined which can be compared to a mobile device interface identifier that was provided in the response from the location server 132. If the mobile device ID matches the MAC determined by an ARP table lookup (YES at 706), an attempt to connect with the mobile device 102/152 can be performed (708). If the connection is successful (YES at 710) the electronic document 101 can be sent from the sender device 104 to a directory on the mobile device 102/152 (712). If the connection is not successful (NO at 710) or the device interface ID and MAC ID do not match (NO at 706), the mobile device printer driver 109 may be configured to request an alternate access method from the location server 132. If an alternate access method can be requested (YES at 720) a send failure notification or alternate access request can be sent to the location server 132 (726). The alternate access method may involve the location server 132 determining accessibility of the mobile device 102/152 through SIP/SDP, STUN, TURN and ICE traversal methods that would be provided to the sender device 104. If an alternate access method is not available, (NO at 720), the electronic document 101 can be transferred to network dropbox 136 designated to mobile device (722) to be accessed by the mobile device 102/152. The sender device 104 can then send a kicker packet to the mobile device (724). The kicker packet notifies the mobile device 102/152 that a electronic document 101 is available for retrieval.

Figure 8:
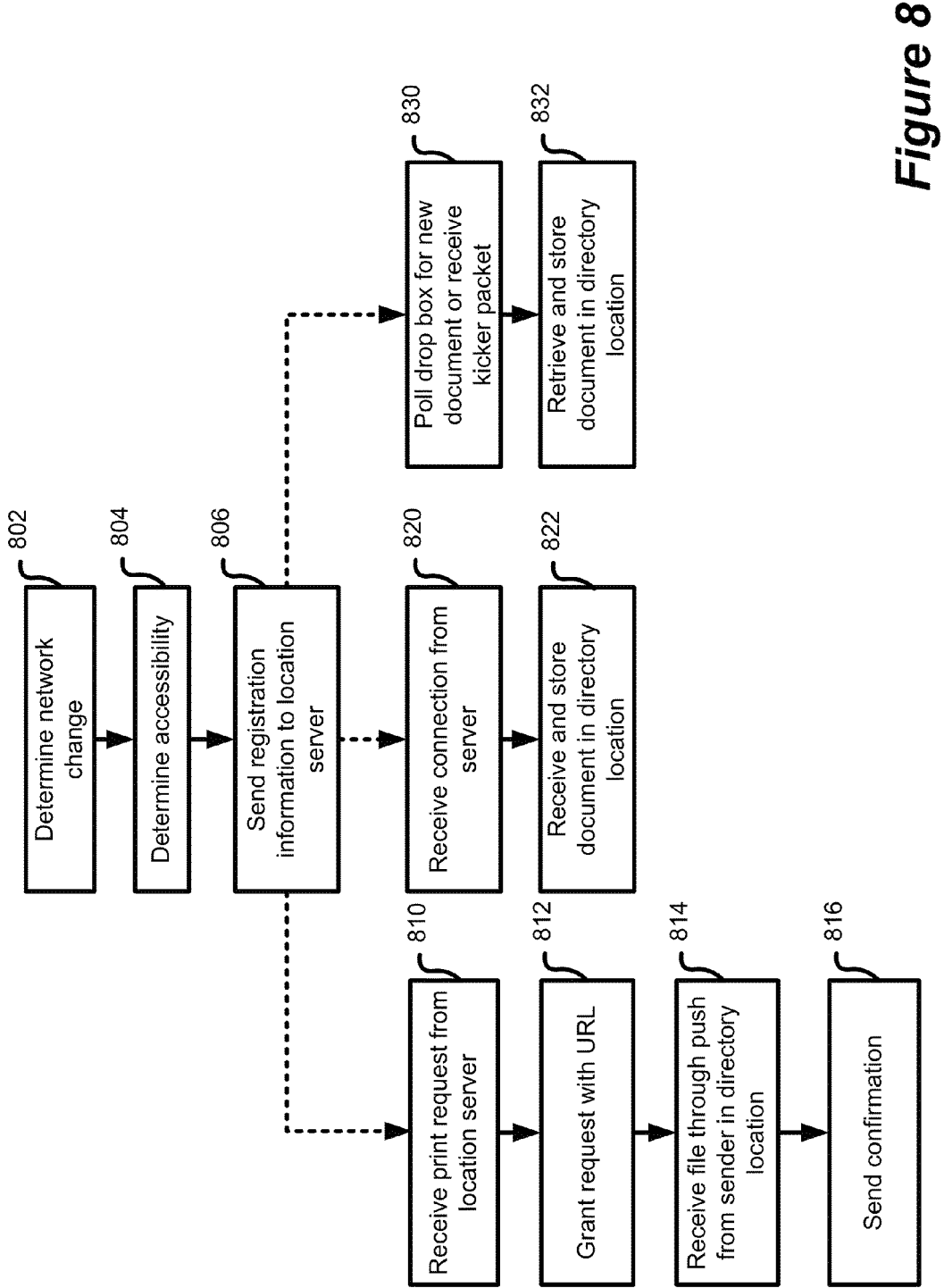
FIG. 8 shows a method of operation of a mobile device for receiving a document from a sender device.

FIG. 8 shows a method of operation of a mobile device 102/152. The mobile device 102/152 determines a network change has occurred or new network access initiated (802). When a firewall/NAT traversal technique is implemented the mobile device 102/152 will determine open ports by querying or probing the firewall/NAT or requesting open ports through the firewall/NAT (804) such as by using universal plug and play (UPnP) protocol configuration techniques. The mobile device may also determine which access techniques may be utilized based upon the network context of the mobile device 102/152 relative to the location server 132 or a known sender device 104. For example if the server and device are on the same network or subnet or are both publicly accessible. Registration information comprising device identifier, an associated network address and a device interface identifier is then sent from the device to the location server 132 (806). The registration information may also include a local network address, a gateway address, port identification, one or more directories, firewall/NAT traversal information such as specific ports or configuration parameters, and identification of kicker packet port and payload information depending on the access techniques available. Providing the individual parameters such as the directory or kicker packet information may not be required on each network context change and may be configured once, at specific intervals, and stored at the location server 132. The mobile device 102/152 may operate in different modes depending on the access techniques available through the network.

The mobile device 102/152 receives a print request from the location server 132 (810). The mobile device 102/152 grants the access request by providing a URL to the location server 132 that can be used to directly connect from the sender device 104 to the mobile device 102/152 (812). The sender device 104 uses the URL to connect to the mobile device 102/152 and transfer the file (e.g. electronic document 101) by a push mechanism such as and HTTP push or a HTTPS push (814). The mobile device 102/152 can then send confirmation when the transfer is competed (816).

Alternatively, a direct connection request can be received from sender device 104 or a server (820) and an electronic document 101 is received and stored in a directory on the mobile device (822). Alternatively or additionally the mobile device 102/152 may periodically poll a network based stored location 136 or receive an expected kicker packet (830) and retrieve and store any electronic document 101 that has been stored there (832). Alternatively the mobile device 102/152 may be notified, via an alternate mechanism such as e-mail, short message service (SMS) or other messaging means, that an electronic document 101 can be retrieved. A notification mechanism on the mobile device 102/152 alerts the user when an electronic document 101 is received. A document viewing application may allow—the mobile device user to view any documents received. In addition the application may allow the user to move the documents, delete documents, forward documents and other similar document handling actions.

Figure 9:
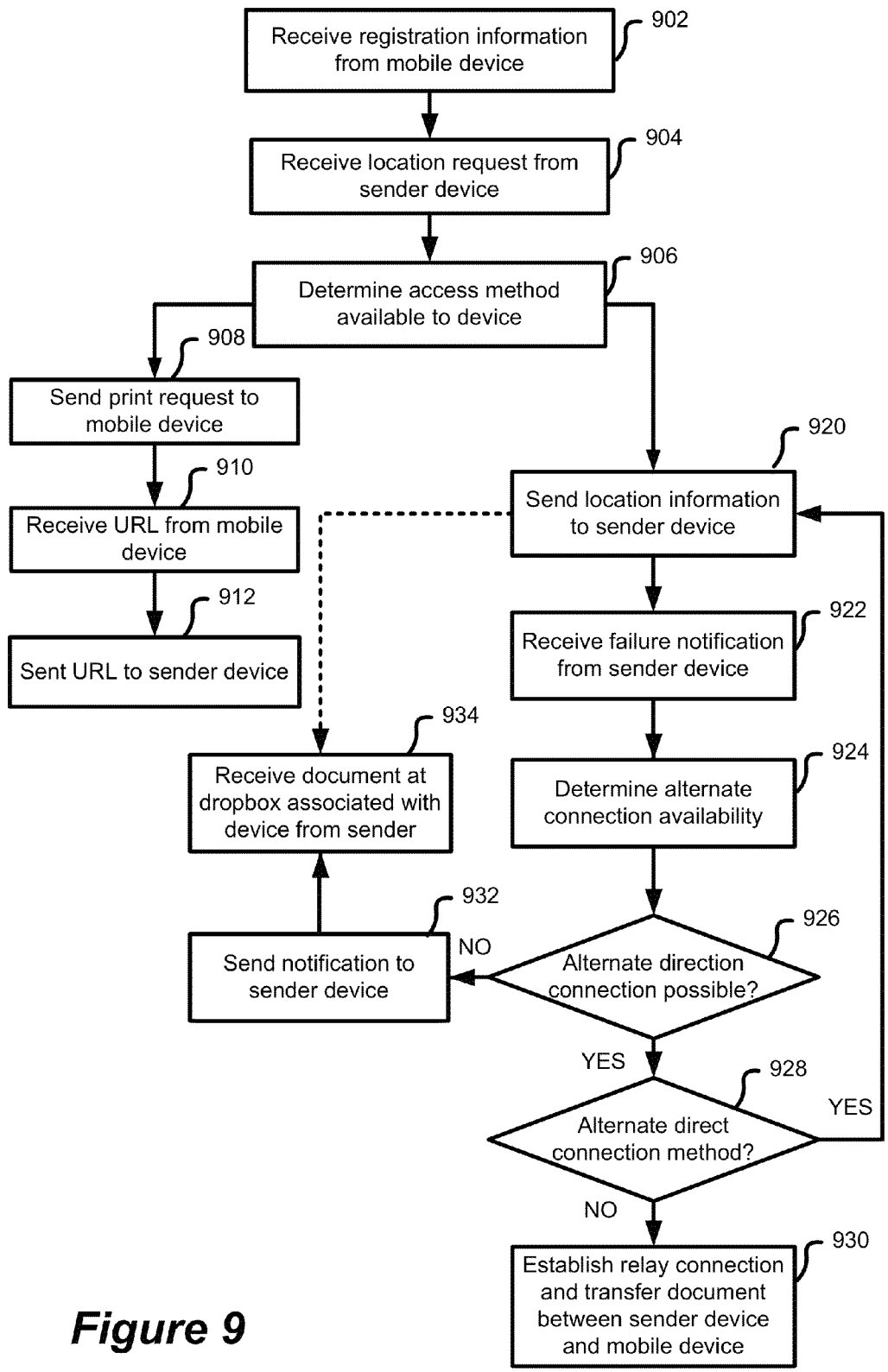
FIG. 9 shows a method of operation of a location server to enable document printing between a sender device and a mobile device.

FIG. 9 shows a method of operation of a location server 132. The location server 132 receives registration information from the mobile device 102/152 (902). The location server 132 in addition to receiving a device identifier may also receive a device interface identifier, such as a MAC address, and may also receive directory identification from a mobile device 102/152 in the registration information. When a firewall/NAT traversal mechanism is being utilized, traversal information may be included in addition to parameters to facilitate kicker packet transmission. When a location request is received from sender device 104 that includes a mobile device identifier, or associated user ID (904), the location server 132 performs a lookup to determine network address information, a device interface identifier and may also determine additional information such as directory and possible access techniques that may be utilized (906). Depending on the information provided, the location server 132 may determine which access technique may provide more likely success at establishing a connection between the mobile device 102/152 and sender device 104. The location server 132 may make this determination based upon information provided in the mobile device 102/152 registration information or based upon polling of the mobile device 102/152 to determine the access technique. If device can be accessible by a URL or HTTP request, the print request is sent to the mobile device 102/152 (908). The mobile device 102/152 will provide an URL in an HTTP or HTTPS format associated with the mobile device 102/152 (910). The server can then provide the URL to the sender device 104 (912). If the transfer is unsuccessful the sender device 104 may request alternate techniques to send the electronic document 101 to the mobile device 102/152. If alternate connection methods are not supported by the system and a direct connection is unsuccessful, a dropbox 136 may be associated with the mobile device 102/152, either on the location server 132 or by cloud storage services (934). If alternate connection methods are supported, for example protocols such as SIP/SDP, STUN, TURN and ICE, when the sender device 104 provides notification that connection to the mobile device 102/152 was not successful based upon the location information (922), the location server 132 can then determine alternate connection method. For example the location server 132 may perform NAT characterization to determine if an accessible port is available or if a relay server capability is available (924). If an alternate method is successfully determined (YES at 926), and the connection is a direct connection between the sender device 104 and the mobile device 102/152 (YES at 928) the alternate connection information is provided to the sender device 104 (920). The alternate information may for example be a port identifier for traversing a firewall/NAT device 140 or traversal information provided by the mobile device 102/152 in the registration information. If the alternate connection is not direct and is for example a relay connection (NO at 928), the location server 132 may act as a relay device to provide a connection between the sender device 104 and relay device to traverse a NAT device 140 (930). If an alternate direction connection is not possible with the mobile device 102/152 (NO at 926), a notification can be provided to the sender device 104 (932) to direct the sender device 104 to utilize the dropbox functionality for the electronic document 101.

FIG. 10 is a schematic depiction of an example mobile device for receiving 'printed' documents. As shown by way of example in FIG. 10, the mobile device 102/152, includes a processor (or microprocessor) 1010 for executing one or more applications, memory in the form of flash memory 1050 and RAM 1052 (or any equivalent memory devices) for storing the one or more applications, related data and received electronic documents 101, and a user interface 1020 with which the user interacts with the device. The user interface 1020 may include a display 1022 and a touch screen 1026.

As shown by way of example in FIG. 10, the mobile device 102/152 may include a radiofrequency (RF) transceiver comprising a receiver 1012 and associated receiver antenna 1016 and transmitter 1014 and associated transmitter antenna 1018. The mobile device 102/152 may be in a portable form factor such as a smart phone, tablet, net book, laptop, portable computing device or an integrated mobile computer device that may access different networks wirelessly. The RF transceiver for communication with a wireless network 1002 using a wireless communication protocols such as, for example but not limited to, GSM, UMTS, LTE, HSPDA, CDMA, W-CDMA, Wi-MAX, Wi-Fi etc. A subscriber identify module (SIM) card 1054 may be provided depending on the access technology supported by the device. Optionally, where the device is a voice-enabled communications device such as, for example, a tablet, Smartphone or cell phone, the device would further include a microphone 1058 and a speaker 1056. Short-range communications 1030 is provided through wireless technologies such as Bluetooth™ or wired Universal Serial Bus™ connections to other peripheries or computing devices or by other device sub-systems 1040 which may enable access tethering using communications functions of another mobile device. In a tethering configuration the mobile device may provide the network information associated with the tethered or master device to be used to access the network. This device may optionally include a Global Positioning System (GPS) receiver chipset 1080 or other location-determining subsystem.

The mobile device 102/152 also includes an operating system 1060 and software components 1062 to 1068 which are described in more detail below. The operating system 1060 and the software components 1062 to 1068 that are executed by the microprocessor 1010 are typically stored in a persistent store such as the flash memory 1050, which may alternatively be a read-only memory (ROM) or similar storage element (not shown). Those skilled in the art will appreciate that portions of the operating system 1060 and the software components 1062 to 1068, such as specific device applications, or parts thereof, may be temporarily loaded into a volatile store such as the RAM 1052. Other software components can also be included, as is well known to those skilled in the art.

The subset of software applications that control basic device operations, including data and voice communication applications, may be installed on the mobile device 102/152 during its manufacture. Other software applications include a message application 1062 that can be any suitable software program that allows a user of the mobile device 102/152 to send and receive electronic messages. The software applications can further comprise a networking component 1066, directory component 1068, and other suitable modules (not shown). The networking component 1066 can determine which interfaces the mobile device can access for IP connectivity. The directory component 1068 can identify directories for storing electronic documents 101 on the device in RAM, or network storage based dropbox locations where electronic documents 101 can be retrieved.

Some examples of other software components 1064 that may be executed by the operating system 1060 may include, peer-to-peer or instant messaging application, social networking, mapping, internet browser, calendar, address book and phone applications It will be appreciated that the various applications may operate independently or may utilize features of other applications. For example, the phone application and messaging application may use the address book for contact details.

Although certain methods, apparatus, computer readable memory, and articles of manufacture have been described herein, the scope of coverage of this disclosure is not limited thereto. To the contrary, this patent covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

The invention claimed is:

1. A method of transferring an electronic document from a sending device to a mobile device the method comprising:
   receiving an indication to print an electronic document on the sending device;
   sending from the sending device to a location server a request generated from a mobile device printer driver executed by the sending device, the request comprising a target identifier for receiving the electronic document;
   receiving at the sending device from the location server a network identifier of the mobile device associated with the target identifier, the network identifier provided to the location server by the mobile device after the mobile device has registered to a network;
   formatting at the sending device the electronic document based on one or more parameters associated with the mobile device; and
   transferring the formatted electronic document from the sending device using the network identifier in response to the indication to print the electronic document;
   wherein transferring the formatted electronic document further comprises determining an access method through a network address translation (NAT) device between a first network coupled to the location server and the network on which the mobile device is registered when the sender device cannot access the mobile device after attempting a direct connection using the received network identifier.

2. The method of claim 1 further comprising receiving at the location server a registration message from the mobile device when it connects to the network, the registration message comprising the target identifier associated with the mobile device and the network identifier assigned to the mobile device.

3. The method of claim 1 wherein the network identifier is a universal resource locator (URL) and transferring the formatted electronic document further comprises performing a hyper text transfer protocol (HTTP) post or a secure hyper text transfer protocol (HTTP) post using the received URL to transfer the formatted electronic document directly from the sending device to the mobile device.

4. The method of claim 1 wherein transferring the formatted electronic document further comprises:
   transferring from the sending device the formatted electronic document to a network storage location;
   sending from the sending device a notification to the mobile device to identify that the formatted electronic document is available to be retrieved from the network storage location.

5. The method of claim 1 wherein transferring the formatted electronic document further comprises:
   sending from the sending device an echo request packet to a network address associated with the network identifier;
   receiving at the sending device one or more echo reply packets, containing network information, in response to the echo request packet from the network address; and
   determining at the sending device a medium access control (MAC) address associated with the network address by performing an address resolution protocol (ARP) lookup based on network information obtained from the echo reply;
   transferring from the sending device the formatted electronic document to the determined MAC address.

6. The method of claim 5 wherein when the determined MAC address does not match the network address, the formatted electronic document is transferred to a network storage location for retrieval by the mobile device.

7. The method of claim 6 wherein the sending device sends a packet to the mobile device to notify the mobile device to retrieve the formatted electronic document from the network storage location.

8. The method of claim 7 wherein the packet is generated using a port identifier associated with the provided network address and payload information received from the location server.

9. The method of claim 5 wherein when the determined MAC address does not match the network address, the method further comprising:
   sending from the sending device a notification to the location server that the mobile device is not accessible; and
   receiving an alternate network identifier to connect to the mobile device.

10. The method of claim 5 wherein the network address is provided from network address translation (NAT) device and the mobile device has a private network address on a network behind the NAT device, the mobile device accessible through the network address and a port associated with the NAT device where the sender device is on a different network from the mobile device and can only access the mobile device through the NAT device.

11. The method of claim 1 wherein the target identifier is a user account identifier associated with one or more unique mobile device identifiers, wherein the formatted electronic document can be transferred to one or more unique mobile device identifiers based on the target identifier.

12. A sending device for transferring an electronic document, the sending device comprising:
   a processor;
   a memory coupled to the processor containing instructions for execution by the processor, the instruction for performing:
      receiving an indication to print an electronic document on the sending device;
      sending to a location server a request generated from a mobile device printer driver executed by the sending device, the request comprising a target identifier for receiving the electronic document;
      receiving from the location server a network identifier of a mobile device associated with the target identifier, the network identifier provided to the location server by the mobile device after the mobile device has registered to a network;

formatting the electronic document based on one or more parameters associated with the mobile device; and transferring the formatted electronic document using the network identifier in response to the indication to print the electronic document wherein transferring the formatted electronic document further comprises determining an access method through a network address translation (NAT) between a first network coupled to the location server and the network on which the mobile device is registered when the sender device cannot access the mobile device after attempting a direct connection using an initially received network identifier.

13. The sending device of claim 12 wherein the mobile device registers with the location server when it connects to the network, the registration comprising the target identifier associated with the mobile device and the network identifier assigned to the mobile device.

14. The sending device of claim 12 wherein the network identifier is a universal resource locator (URL) and transferring the formatted electronic document further comprises performing a hyper text transfer protocol (HTTP) post or a secure hyper text transfer protocol (HTTP) post using the received URL to transfer the formatted electronic document directly from the sending device to the mobile device.

15. The sending device of claim 12 wherein transferring the formatted electronic document further comprises:
transferring the formatted electronic document to a network storage location;
sending a notification to the target identifier to identify that the formatted electronic document is available to be retrieved from the network storage location.

16. The sending device of claim 12 wherein transferring the formatted electronic document further comprises:
sending an echo request packet to a network address associated with the network identifier;
receiving one or more echo reply packets, containing network information, in response to the echo request packet from the network address; and
determining a medium access control (MAC) address associated with the network address by performing an address resolution protocol (ARP) lookup based on network information obtained from the echo reply;
transferring the formatted electronic document to the determined MAC address.

17. The sending device of claim 16 wherein when the determined MAC address does not match the network address, the formatted electronic document is transferred to a network storage location for retrieval by the mobile device.

18. The sending device of claim 17 wherein the sending device sends a packet to the mobile device to notify the mobile device to retrieve the formatted electronic document from the storage location.

19. The sending device of claim 18, where in the packet is generated using a port identifier associated with the provided network address and payload information received from the location server.

20. The sending device of claim 16 wherein when the determined MAC address does not match the network address, the method further comprising:
sending a notification to the location server that the mobile device is not accessible; and
receiving an alternate network identifier to connect to the mobile device.

21. The sending device of claim 12 wherein the network address is provided from network address translation (NAT) device and the mobile device has a private network address on a network behind the NAT device, the mobile device accessible through the network address and a port associated with the NAT device where the sender device is on a different network from the mobile device and can only access the mobile device through the NAT device.

22. The sending device of claim 12 wherein the target identifier is a user account identifier associated with one or more unique device identifiers wherein the formatted electronic document can be transferred to one or more unique device identifiers based on the target identifier.

23. A non-transitory computer readable memory containing instructions for transferring an electronic document from a sending device to a mobile device the instructions which when executed by a processor perform:
receiving an indication to print an electronic document on the sending device;
sending from the sending device to a location server a request generated from a mobile device printer driver executed by the sending device, the request comprising a target identifier for receiving the electronic document;
receiving at the sending device from the location server a network identifier of the mobile device associated with the target identifier, the network identifier provided to the location server by the mobile device after the mobile device has registered to a network;
formatting at the sending device the electronic document based on one or more parameters associated with the mobile device; and
transferring the formatted electronic document from the sending device using the network identifier in response to the indication to print the electronic document wherein transferring the formatted electronic document further comprises determining an access method through a network address translation (NAT) between a first network coupled to the location server and the network on which the mobile device is registered when the sender device cannot access the mobile device after attempting a direct connection using an initially received network identifier.

* * * * *